US012385621B1

(12) United States Patent
Momin et al.

(10) Patent No.: US 12,385,621 B1
(45) Date of Patent: Aug. 12, 2025

(54) LED FRAME FIXTURE

(71) Applicant: ABL IP HOLDING LLC, Atlanta, GA (US)

(72) Inventors: Mohamed Momin, Roswell, GA (US); Caleb T. Badley, Sharpsburg, GA (US); Nicholas Adams, Norcross, GA (US); Andrew Banovic, Gulf Shores, AL (US); Freedom Wen, Shanghai (CN); Chen Yuxi, Xiamen (CN); Wu Yanghui, Xiamen (CN); Lan Guohua, Xiamen (CN); Li Wenhui, Xiamen (CN)

(73) Assignee: ABL IP HOLDING LLC, Atlanta, GA (US)

( * ) Notice: Subject to any disclaimer, the term of this patent is extended or adjusted under 35 U.S.C. 154(b) by 0 days.

(21) Appl. No.: 18/423,704

(22) Filed: Jan. 26, 2024

(51) Int. Cl.
*F21V 3/02* (2006.01)
*F21S 4/28* (2016.01)
(Continued)

(52) U.S. Cl.
CPC .................................... *F21V 3/02* (2013.01); *F21S 4/28* (2016.01); *F21V 21/048* (2013.01);
(Continued)

(58) Field of Classification Search
CPC ........ F21V 3/02; F21V 21/048; F21V 23/006; F21S 4/28; F21Y 2103/10; F21Y 2113/00; F21Y 2115/10
See application file for complete search history.

(56) References Cited

U.S. PATENT DOCUMENTS

| | | | | |
|---|---|---|---|---|
| 7,815,338 B2 * | 10/2010 | Siemiet | F21S 4/28 | 362/249.02 |
| 8,746,933 B2 * | 6/2014 | Cho | F21S 4/20 | 362/249.02 |

(Continued)

OTHER PUBLICATIONS

"LedVance Luminaires Value Class Dual Selectable T-Fit Panel Bars," printed Feb. 13, 2024, https://www.ledvanceus.com/products/luminaires/indoor/panels/Pages/Value-Class-Dual-Selectable-T-FIT-Panel-Bars.aspx, 5 pages.

(Continued)

*Primary Examiner* — Tsion Tumebo
(74) *Attorney, Agent, or Firm* — Buchanan Ingersoll & Rooney PC

(57) ABSTRACT

A light fixture includes a frame that includes a plurality of frame pieces configured for assembly around a ceiling tile to form the light fixture. Each of the plurality of frame pieces include an L-shaped diffuser and a circuit board that includes a plurality of light sources to emit illumination. The L-shaped diffuser includes a diffuser body that is asymmetric in transparency to direct more illumination from the light sources to inside the ceiling tile than outside the ceiling tile. The diffuser body includes an outside wall that is substantially opaque, an inside wall that is at least partially substantially transparent, and a bottom wall that is substantially transparent. The light fixture can further include a connector to connect adjoining frame pieces together, which includes a substantially opaque portion below the circuit board and a substantially transparent portion above to allow illumination to pass between the adjoining frame pieces.

21 Claims, 14 Drawing Sheets

(51) Int. Cl.

| | |
|---|---|
| ***F21V 21/04*** | (2006.01) |
| ***F21V 23/00*** | (2015.01) |
| ***F21Y 103/10*** | (2016.01) |
| ***F21Y 113/00*** | (2016.01) |
| ***F21Y 115/10*** | (2016.01) |

(52) U.S. Cl.

CPC ......... *F21V 23/006* (2013.01); *F21Y 2103/10* (2016.08); *F21Y 2113/00* (2013.01); *F21Y 2115/10* (2016.08)

(56) References Cited

U.S. PATENT DOCUMENTS

| | | | | |
|---|---|---|---|---|
| 8,915,611 | B2 * | 12/2014 | Zhang | F21S 2/005 362/241 |
| 10,125,968 | B2 * | 11/2018 | Zanotto | F21V 3/02 |
| 10,364,974 | B2 | 7/2019 | Myers et al. | |
| 11,221,112 | B2 * | 1/2022 | Mitsuzuka | F21K 9/278 |
| 11,248,759 | B2 * | 2/2022 | Gao | F21V 23/06 |
| 11,821,597 | B1 * | 11/2023 | Irons | F21S 4/28 |
| 2012/0243217 | A1 * | 9/2012 | Szprengiel | F21S 4/28 362/223 |
| 2015/0345765 | A1 * | 12/2015 | Horst | F21V 21/005 362/362 |
| 2016/0116118 | A1 * | 4/2016 | Bernard | F21V 33/006 362/224 |
| 2022/0162853 | A1 * | 5/2022 | Yeo | F21V 21/048 |
| 2022/0228723 | A1 * | 7/2022 | Bryan | G02B 27/0012 |
| 2023/0235866 | A1 * | 7/2023 | Sorensen | F21V 21/048 362/147 |
| 2024/0183516 | A1 * | 6/2024 | Zhang | F21S 4/28 |

OTHER PUBLICATIONS

"LedVance Luminaires Dual Selectable T-Fit," Feb. 2023, https://assets3.ledvanceus.com/media/resource/original/asset-13119654, 4 pages.
"LedVance Panel Bars Value Class," printed Mar. 21, 2024, https://assets3.ledvanceus.com/media/resource/original/asset-13128932, 12 pages.
"Litetronics Vivid LED Frame," printed Mar. 21, 2024, https://www.litetronics.com/products/led-luminaires/vivid-led-frame/, 11 pages.
"Litetronics Vivid LED Frame with Selectable Output and CCT," Nov. 28, 2023, https://www.litetronics.com/wp-content/uploads/2023/04/Vivid-LED-Frame_Spec-Sheet_v5.7.pdf, 3 pages.
"Litetronics Vivid LED Frame Installation Instructions," printed Mar. 25, 2022, https://www.litetronics.com/wp-content/uploads/2022/06/Vivid-LED-Frame_Installation-Instructions_v3.pdf, 4 pages.
"Litetronics Vivid Brochure," accessed Mar. 21, 2024, https://www.litetronics.com/wp-content/uploads/2022/06/Vivid-Large-Brochure.pdf, 8 pages.

* cited by examiner

LED FRAME FIXTURE

TECHNICAL FIELD

The present subject matter is drawn to technologies that improve the aesthetics and light output of a luminaire, such as a light fixture. In particular, the disclosed technologies focus on improving light output from the light fixture, and reducing or even eliminating shadows that can occur at the interface between two connected portions of the light fixture.

BACKGROUND

Electrically powered artificial lighting for general illumination has become ubiquitous in modern society. Electrical lighting equipment is commonly deployed, for example, in homes, buildings of commercial and other enterprise establishments, as well as in various outdoor settings.

In conventional luminaires, such as light fixtures, the luminance output can be turned ON/OFF and often can be adjusted up or dimmed down. In some light fixtures, e.g., using multiple colors of light emitting diode (LED) type sources, the user may be able to adjust a combined color output of the resulting illumination. The changes in intensity or color characteristic of the illumination may be responsive to manual user inputs or responsive to various sensed conditions in or about the illuminated space.

An LED frame fixture is a type of light fixture that typically includes several frame pieces (e.g., linear channels) that can be assembled around 1×4, 2×2, or 2×4 foot ceiling tiles, for example. Typically, the LED frame fixture includes four frame pieces with LEDs and can be wrapped around square or rectangular shaped ceiling tiles in order to put LED lighting on a drop ceiling. The LED frame fixture is suitable for retrofitting a room with light fixtures or new construction installations.

LED frame fixtures include light sources that emit illumination and often include a diffuser to spread out or scatter light output from the light sources. Conventional LED frame fixtures in the market have a U-shaped diffuser that resembles the letter U in cross-sectional profile. The U-shaped diffuser causes an appearance of high glare, especially at a high angle, to an observer of the illumination emitted from the LED frame fixture. Also, conventional LED frame fixtures have shadows or breaks in illumination at the corner where the two frame pieces connect to each other, which does not look appealing to the observer of the illumination from below.

Accordingly, light fixtures, lighting devices, and a lighting system are needed to overcome these and other limitations in the art.

SUMMARY

In a first example, a light fixture 101 includes a frame 105 that includes a plurality of frame pieces 107A-N configured for assembly around a ceiling tile 109 to form the light fixture 101. Each of the plurality of frame pieces 107A-N include an L-shaped diffuser 111 and a circuit board 113 that includes a plurality of light sources 115A-N to emit illumination 117. The L-shaped diffuser 111 includes a diffuser body 119 that is asymmetric in transparency to direct more illumination 117 from the light sources 115A-N to inside 121 the ceiling tile 109 than outside 123 the ceiling tile 109. The diffuser body 119 includes an outside wall 125 that is substantially opaque, an inside wall 127 that is at least partially substantially transparent, and a bottom wall 129 that is substantially transparent.

In a second example, a light fixture 101 includes a frame 105 that includes a plurality of frame pieces 107A-N configured for assembly around a ceiling tile 109 to form the light fixture 101. Each of the plurality of frame pieces 107A-N include an L-shaped diffuser 111 and a circuit board 113 that includes a plurality of light sources 115A-N to emit illumination 117. The L-shaped diffuser 111 includes a diffuser body 119 that is asymmetric in transparency to direct more illumination 117 from the light sources 115A-N to inside 121 the ceiling tile 109 than outside 123 the ceiling tile 109. The light fixture 101 further includes a connector 135 to connect adjoining frame pieces 107A-B of the plurality of frame pieces 107A-N together. The connector 135 includes a substantially opaque portion 137 below the circuit board 113 and a substantially transparent portion 139 above the circuit board 113 to allow illumination 117 to pass between the adjoining frame pieces 107A-B.

BRIEF DESCRIPTION OF THE DRAWINGS

The drawing figures depict one or more implementations in accord with the present teachings, by way of example only, not by way of limitation. In the figures, like reference numerals refer to the same or similar elements.

PARTS LISTING

100 Lighting System
101 Light Fixture
102A-N Lighting Control Devices
103A-N Sensors
105 Frame
107A-N Frame Pieces
107A-B Adjoining Frame Pieces
109, 109A-N Ceiling Tiles
111 L-Shaped Diffuser
113 Circuit Board
115A-N Light Sources
115A-B Extra Light Sources
117 Illumination
119 Diffuser Body
121 Inside
123 Outside
125 Outside Wall
127 Inside Wall
129 Bottom Wall
131 Substantially Transparent Portion
133 Substantially Opaque Portion
135, 135A-N Connectors
136, 136A-N Male Connectors
137 Substantially Opaque Portion
139 Substantially Transparent Portion
141 Opening
143 Light Guide
145 Corner
151 Chamfer
153 Angled Surface
155 Highly Reflective Surface
157 Interior Cavity
160 Lighting Device
161 Driver Circuit
163 Cable
167 Ceiling Tile Grid
170 Space
172 Observer
200 Detail Area
300 Detail Area
400 Detail Area
500 Detail Area

DETAILED DESCRIPTION

In the following detailed description, numerous specific details are set forth by way of examples in order to provide a thorough understanding of the relevant teachings. However, it should be apparent to those skilled in the art that the present teachings may be practiced without such details. In other instances, well known methods, procedures, components, and/or circuitry have been described at a relatively high-level, without detail, in order to avoid unnecessarily obscuring aspects of the present teachings.

Reference now is made in detail to the examples illustrated in the accompanying drawings and discussed below.

Figure 1A:
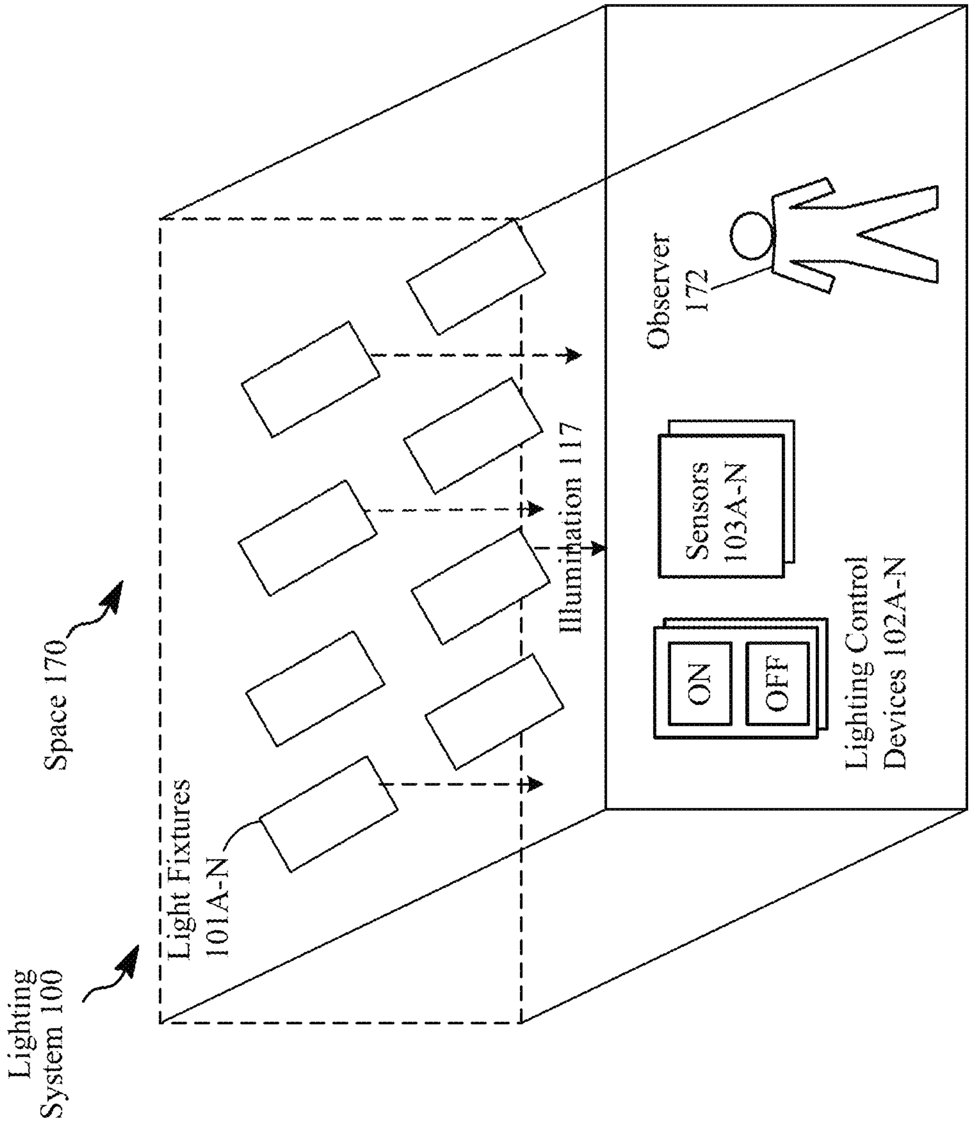
FIG. 1A depicts a lighting system that includes a plurality of light fixtures located in a space, such as a room or a building.

FIG. 1A depicts a lighting system 100 that includes a plurality of light fixtures 101A-N located in a space 170, such as a room or a building. In the example, light fixtures 101A-N illuminate the space 170 of a premises to a level useful for an observer 172, such as a human, in or passing through a location in the space 170, such as a warehouse, room, or a corridor in a building; or of an outdoor space such as a street, sidewalk, parking lot or performance venue. Lighting control devices 102A-N can be wall switches or touch screen devices to turn on/off or dim light fixtures 101A-N. Occupancy, daylight, or audio sensors 103A-N can enable controls for on/off, occupancy, and dimming of the light fixtures 101A-N.

Figure 1B:
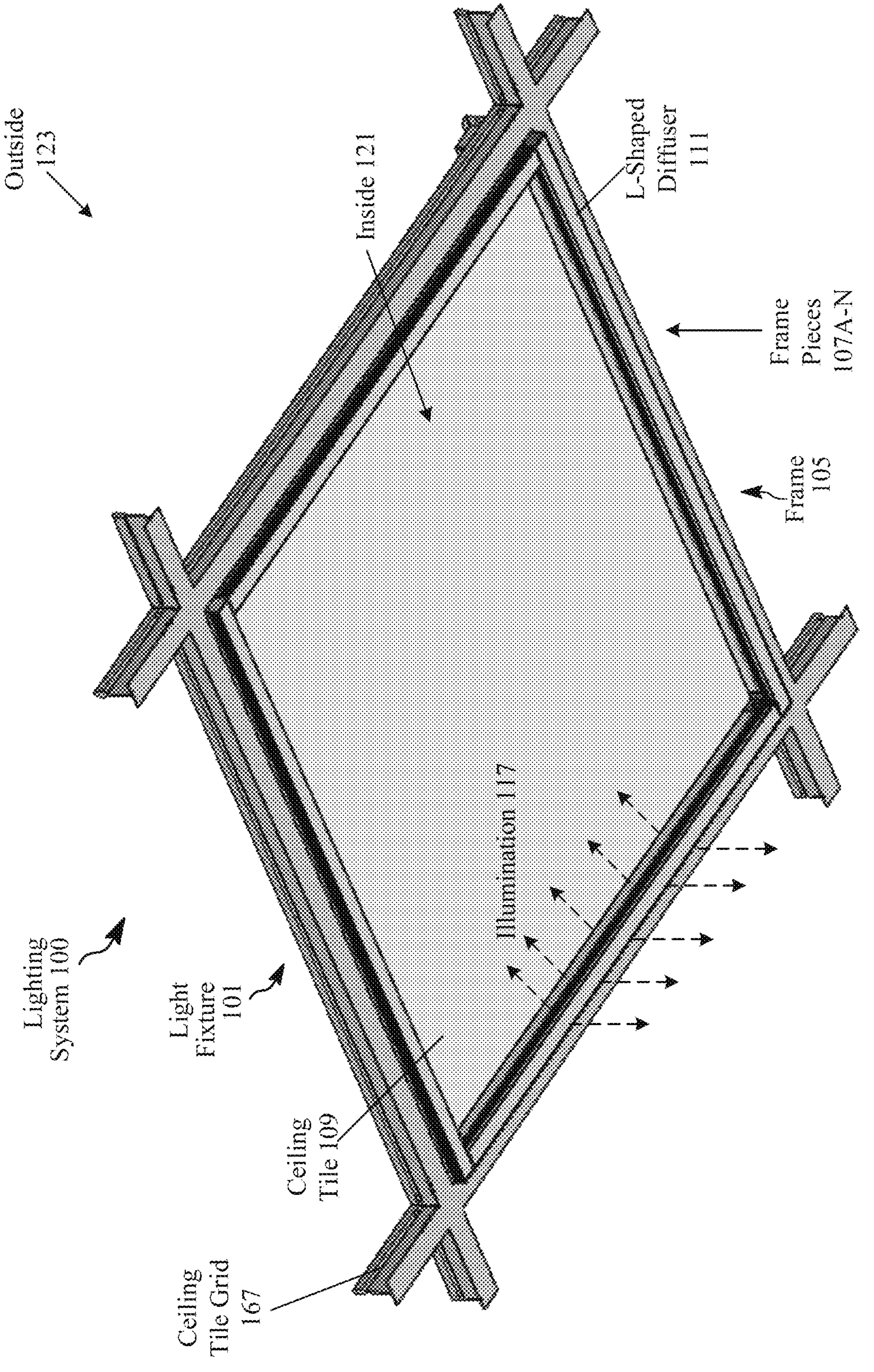
FIG. 1B is an isometric view of a lighting system depicting a light fixture assembled around a ceiling tile of a ceiling tile grid.

FIG. 1B is an isometric view of a lighting system 100 depicting a light fixture 101 assembled around a ceiling tile 109 of a ceiling tile grid 167. The light fixture 101 is illustrated from the perspective of the observer 172 looking up at the ceiling from the floor of the space 170. A light fixture 101 for general illumination 117 of the space 170 like that constructed herein with an L-shaped diffuser 111 has illumination 117 with an appearance of a soft glow on the ceiling tile 109. The soft glow of the illumination 117 can be provided by the uplight enabled by the L-shaped diffuser 111.

The light fixture 101 includes a frame 105 that includes a plurality of frame pieces 107A-N configured for assembly around a ceiling tile 109 to form the light fixture 101. Each of the plurality of frame pieces 107A-N include an L-shaped diffuser 111 and a plurality of light sources 115A-N(see FIG. 2B) to emit illumination 117. After installation of the light fixture 101, the light sources 115A-N are oriented at the bottom of the light fixture 101 and down towards the floor of the space 170 to emit output light rays. For example, the L-shaped diffuser 111 helps to homogenize and spread output light rays by diverging incoming light rays emitted by the light sources 115A-N, for example, to increase a beam angle of the illumination 117. The L-shaped diffuser 111 is asymmetric in transparency to direct more illumination from the light sources 115A-N to inside 121 the ceiling tile 109 than outside 123 the ceiling tile 109.

In the example (see FIG. 2B), a diffuser body 119 of the L-shaped diffuser 111 blocks the illumination 117 from an outside wall 125 to reduce excessive glare and light emitted outside of the ceiling tile 109 by the assembled light fixture 101. The diffuser body 119 of the L-shaped diffuser 111 allows the illumination 117 to be emitted from the bottom wall 129 and shoot down towards the floor to light up the floor of the space 170. The diffuser body 119 also allows the illumination 117 to be emitted from the inside wall 127 to light up inside 121 of the ceiling tile 109 and appear more decorative. In contrast, conventional LED frame fixtures provide an appearance of a cave on the ceiling tile 109.

Figure 1C:
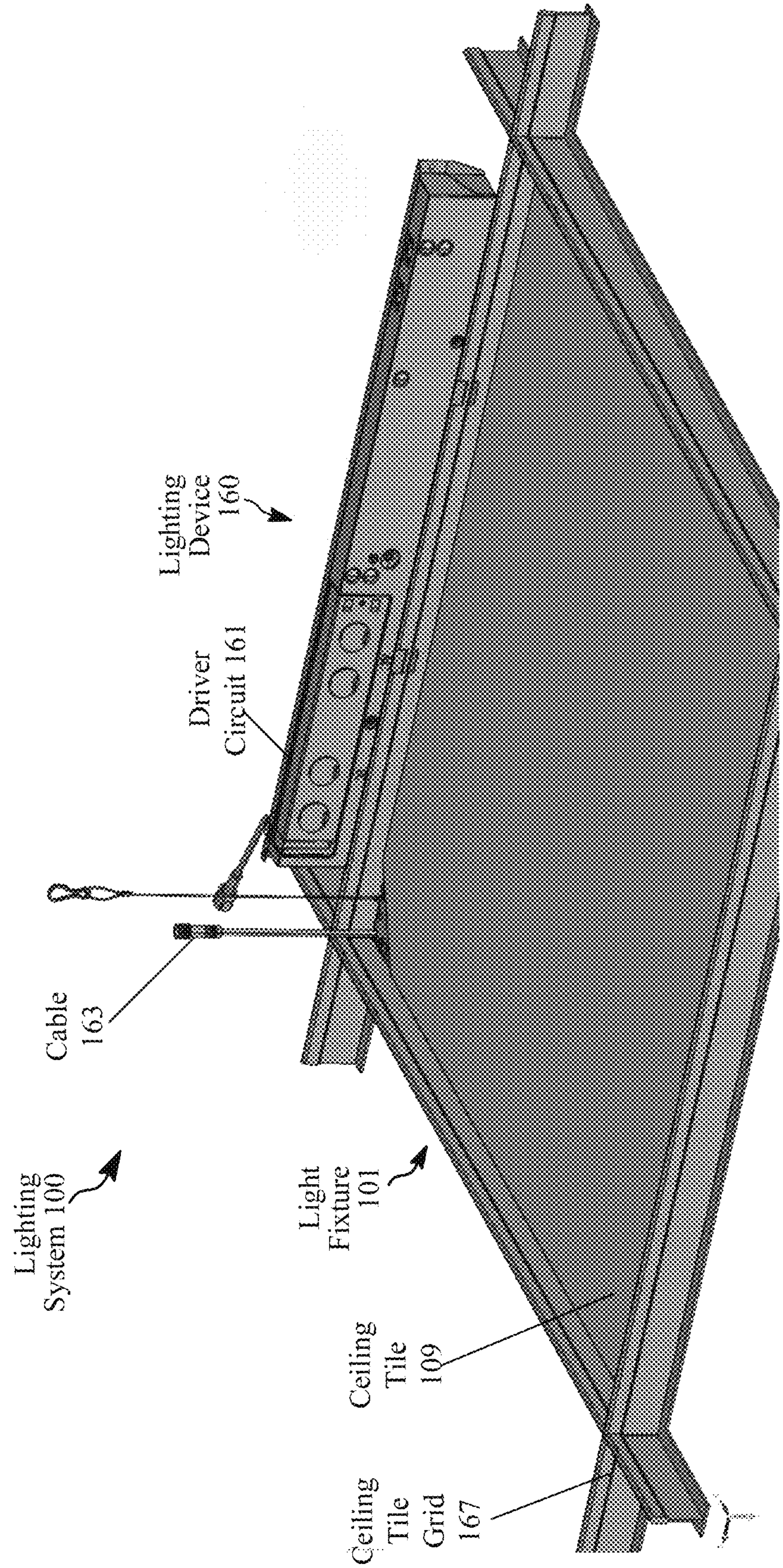
FIG. 1C is another isometric view of the lighting system depicting a lighting device that includes the light fixture.

FIG. 1C is another isometric view of the lighting system 100 depicting a lighting device 160 that includes the light fixture 101. The lighting device 160 is illustrated from the perspective of the observer 172 looking down at the floor from the ceiling of the space 170. The lighting device 160 further includes a driver circuit 161 to control the light sources 115A-N(see FIG. 2B) of the light fixture 101. The lighting device 160 can further include a cable 163 configured to connect via electrical connection to the circuit board 113 (see FIG. 2B) of the light fixture 101 and the driver circuit 161 to control the light sources 115A-N(see FIG. 2B). As shown, the driver circuit 161, such a driver box, is configured to mount on a ceiling tile grid 167 and is mounted separate from the light fixture 101 assembled around the ceiling tile 109. The driver box can include clips and may be held in place on the ceiling tile grid 167 by snapping the clips onto the ceiling tile grid 167. For example, the cable

163 can be an FD4 cable that comes out of the light fixture 101 at a corner 145 (see FIG. 5B) to connect to the driver circuit 161 (e.g., driver box). In some examples, the light fixture 101 may include a ballast instead of the driver circuit 161 depending on the type of illumination light sources 115A-N(e.g., for a fluorescent or incandescent light bulb).

Ceiling tiles 109A-N, also known as ceiling panels, can formed of lightweight construction materials to cover a ceiling. The ceiling tiles 109A-N can be placed in a ceiling tile grid 167 (T-grid) to improve the aesthetics or acoustics of room and provide some thermal insulation. The ceiling tile grid 167 is a frame for suspended ceilings, also known as drop ceilings, that utilize ceiling tiles 109A-N. The ceiling tile grid 167 hangs from the main structural ceiling or beams and can be fastened to the walls of a room to support the ceiling tiles 109A-N to finish the space 170. For example, the ceiling tile grid 167 can include steel or aluminum bars, such as a main beam, cross tees, and wall molding, to support the ceiling tiles 109A-N. The ceiling tiles 109A-N fit in spaces between the ceiling tile grid 167 to complete the ceiling and may be held in place by panel clips to the ceiling tile grid 167.

Figure 2A:
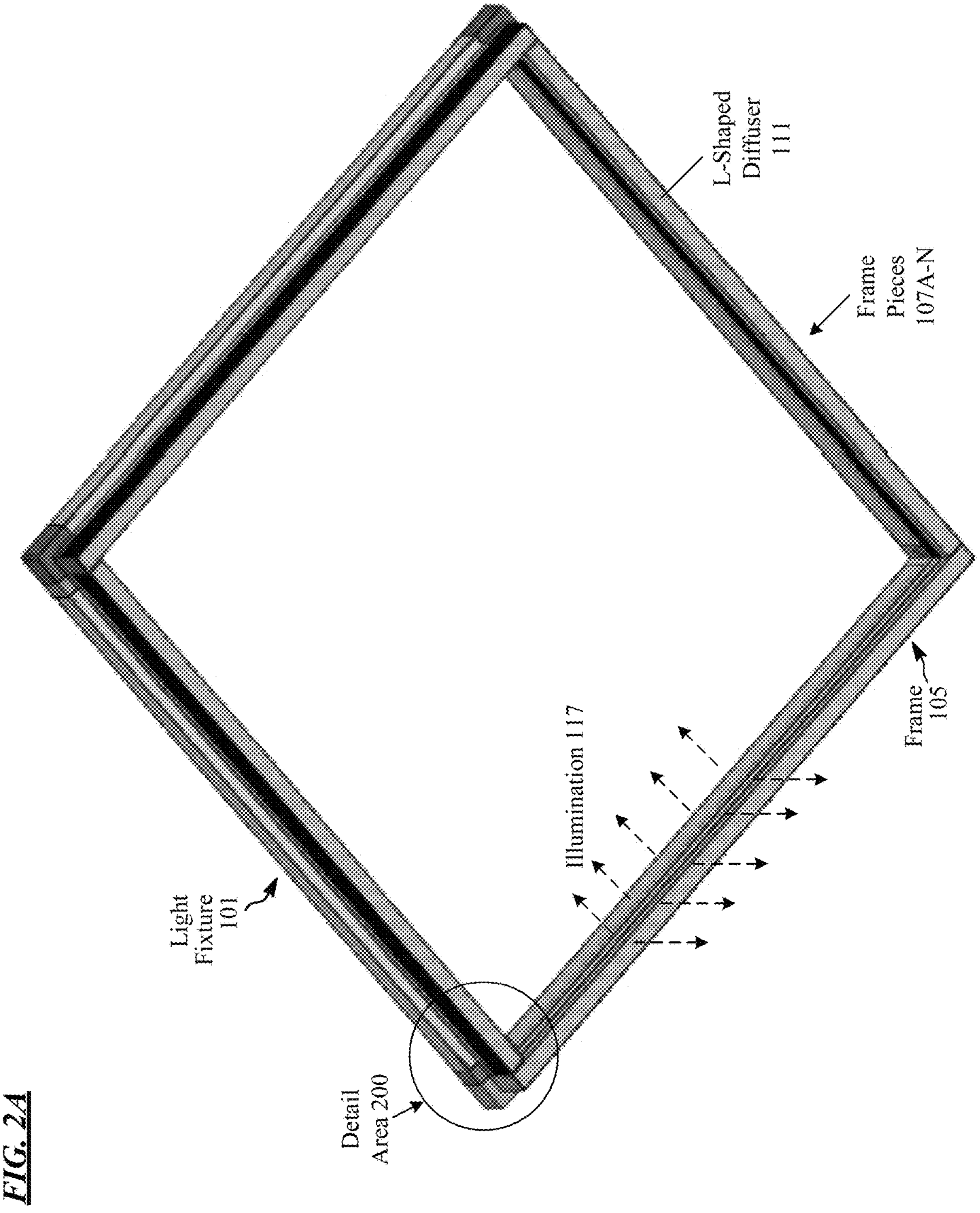
FIG. 2A is a bottom view of the light fixture, with an encircled detail area to show context for the cutaway view of FIG. 2B of adjoining frame pieces and an L-shaped diffuser.
Figure 2B:
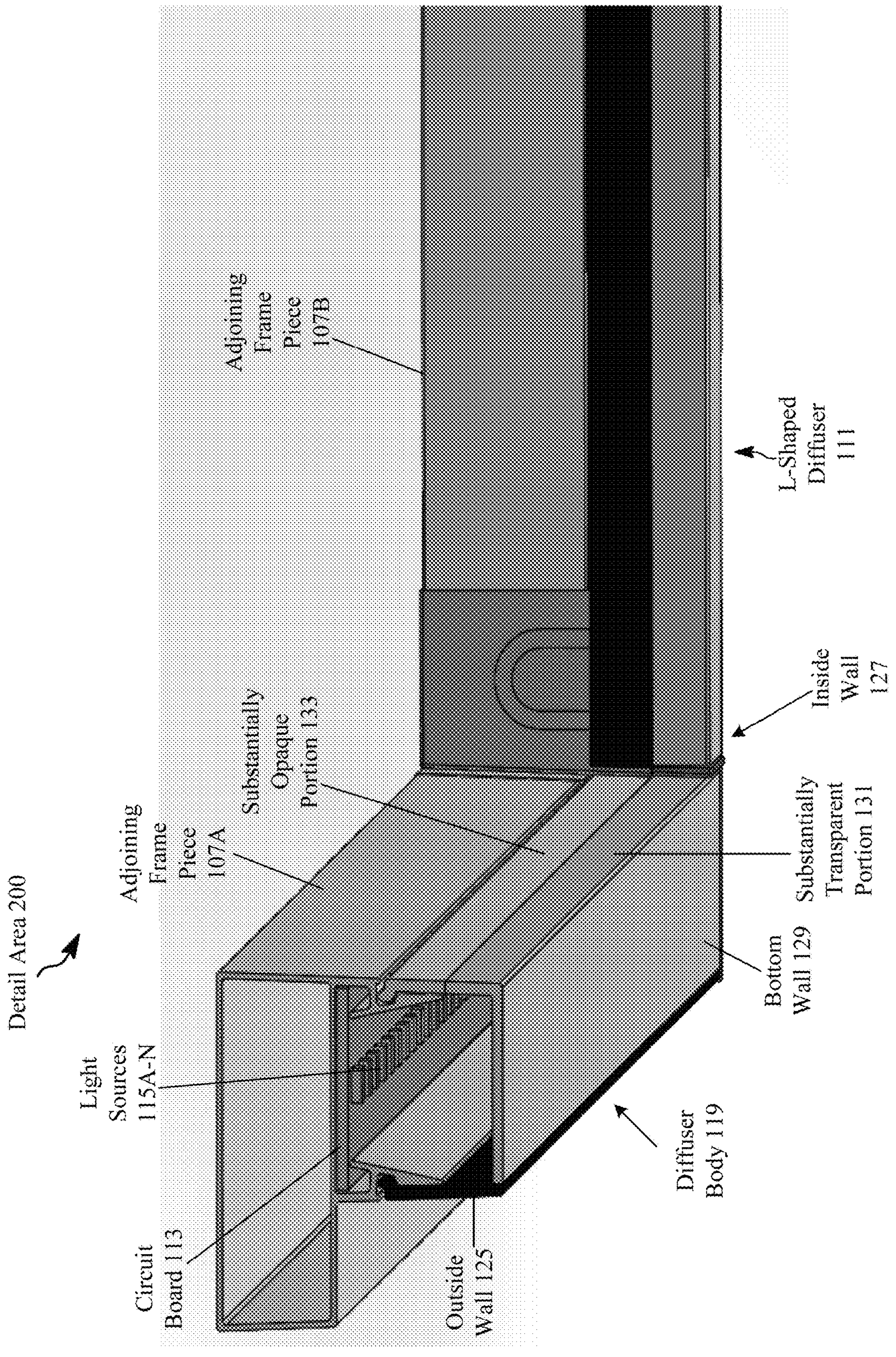
FIG. 2B is a cutaway view of the encircled detail area of FIG. 2A and shows details of adjoining frame pieces, a circuit board, light sources, and the L-shaped diffuser.

FIG. 2A is a bottom view of the light fixture 101, with an encircled detail area 200 to show context for the cutaway view of FIG. 2B of adjoining frame pieces 107A-B and an L-shaped diffuser 111. As shown, the light fixture 101 includes a frame 105 that includes a plurality of frame pieces 107A-N configured for assembly around a ceiling tile 109 to form the light fixture 101.

L-shaped diffuser 111 can control a light distribution of the illumination 117 while trying to maximize optical efficiency of the light output. This improves uniformity of illumination light output intensity of the illumination 117, as may be perceived from a working distance from the light fixture 101, such as by the observer 172 walking on the floor of the space 170 or sitting at a desktop. The L-shaped diffuser 111 can be a film formed of a polycarbonate (PC) substrate, where the substrate typically has an index of refraction of 1.58. If the L-shaped diffuser 111 is formed of acrylic (e.g. PMMA), the substrate typically has an index of refraction of 1.49. If the L-shaped diffuser 111 is formed of low-density polyethylene (LDPE or just PE), the substrate typically has an index of refraction of 1.51.

FIG. 2B is a cutaway view of the encircled detail area 200 of FIG. 2A and shows details of adjoining frame pieces 107A-B, a circuit board 113, light sources 115A-N, and the L-shaped diffuser 111. As depicted, each of the plurality of frame pieces 107A-N include an L-shaped diffuser 111 and a circuit board 113 that includes a plurality of light sources 115A-N to emit illumination 117. The L-shaped diffuser 111 includes a diffuser body 119 that is asymmetric in transparency to direct more illumination 117 from the light sources 115A-N to inside 121 the ceiling tile 109 than outside 123 the ceiling tile 109. Compared to conventional symmetric U-shaped diffusers, the L-shaped diffuser 111 gives more light to the inside 121 of the ceiling tile 109 compared to the outside 123 of the ceiling tile 109. For example, the diffuser body 119 can illuminate the edge and the middle of the ceiling tile 109, but not outside 123 the ceiling tile 109.

The diffuser body 119 includes an outside wall 125 that is substantially opaque, an inside wall 127 that is at least partially substantially transparent, and a bottom wall 129 that is substantially transparent. For example, the inside wall 127 is divided into an upper portion and a lower portion. The upper portion is substantially opaque at the top part of the inside wall 127 (substantially opaque portion 133) to get light out of the lower portion. The lower portion is substantially transparent at the bottom part of the inside wall 127 (substantially transparent portion 131) so it allows up light to the ceiling tile 109 is an uplight configuration. Although the entire diffuser has three walls that form a U-shape, the L-shaped diffuser 111 is said to be L-shaped because the outside wall 125 is an extrusion that is substantially opaque.

Light sources 115A-N include electrical-to-optical transducers, such as various light emitters for illumination 117. The emitted light may be in the visible spectrum or in other wavelength ranges. Suitable light generation sources for light sources 115A-N include various conventional lamps, such as incandescent, fluorescent or halide lamps; one or more light emitting diodes (LEDs) of various types, such as planar LEDs, organic LEDs (OLEDs), micro LEDs, micro OLEDs, LEDs on gallium nitride (GaN) substrates, micro nanowire or nanorod LEDs, photo pumped quantum dot (QD) LEDs, micro plasmonic LED, micro resonant-cavity (RC) LEDs, and micro photonic crystal LEDs; as well as other sources such as micro super luminescent Diodes (SLD) and micro laser diodes. Of course, these light generation technologies are given by way of non-limiting examples, and other light generation technologies may be used. For example, it should be understood that non-micro versions of the foregoing light generation sources can be used.

Figure 2C:
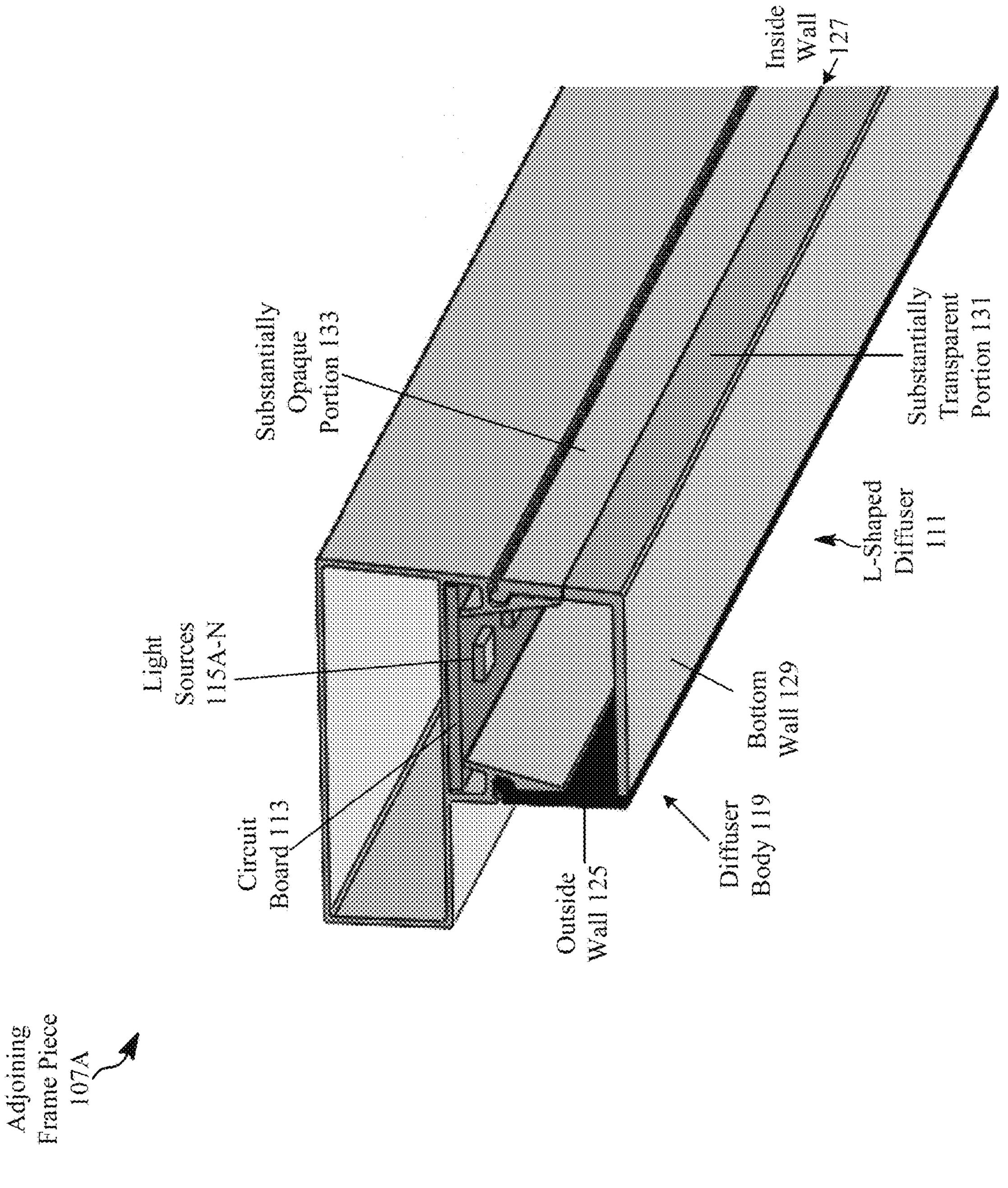
FIG. 2C is a cutaway view of the adjoining frame piece of FIG. 2B showing details of the inside wall of the diffuser body of the L-shaped diffuser.

FIG. 2C is a cutaway view of the adjoining frame piece 107A of FIG. 2B showing details of the inside wall 127 of the diffuser body 119 of the L-shaped diffuser 111. The inside wall 127 can be at least partially substantially transparent, such as split into portions so a bottom portion oriented towards the floor of the space 170 is a substantially transparent and a top portion is substantially opaque. Hence, as shown, the inside wall 127 includes a substantially transparent portion 131 (e.g., highly light transmissive) configured to illuminate inside the ceiling tile 109 and a substantially opaque portion 133 to direct illumination 117 to the bottom wall 129. The outside wall 125 is substantially opaque to block illumination 117 from appearing outside 123 of the ceiling tile 109 and thereby reduce glare. The diffuser body 119 can be co-extruded as a single extrusion of optical material with a white pigment for substantially opaque portions. For example, the optical material is for substantially transparent portions of the diffuser body 119 and can be optically transparent or optically clear. The optical material can be formed of polycarbonate or acrylic. Although a white opaque material is used for substantially opaque portions to block and reflect light from light sources 115A-N, a different color besides white can be used as desired for a particular layout of the L-shaped diffuser 111.

Figure 3A:
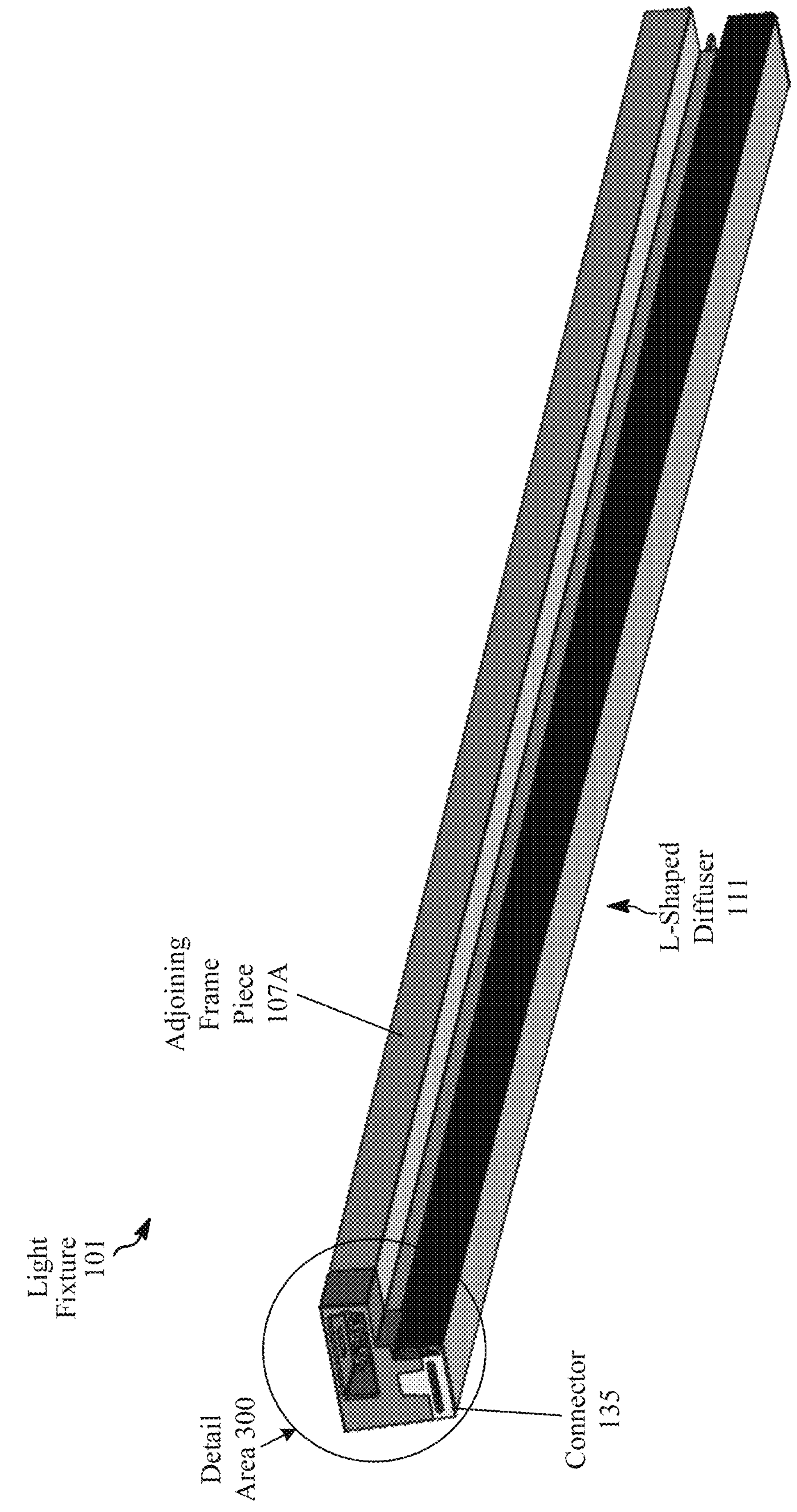
FIG. 3A is an isometric view of the adjoining frame piece, with an encircled detail area to show context for the cutaway views of FIGS. 3B-C of a connector between adjoining frame pieces.
Figure 3B:
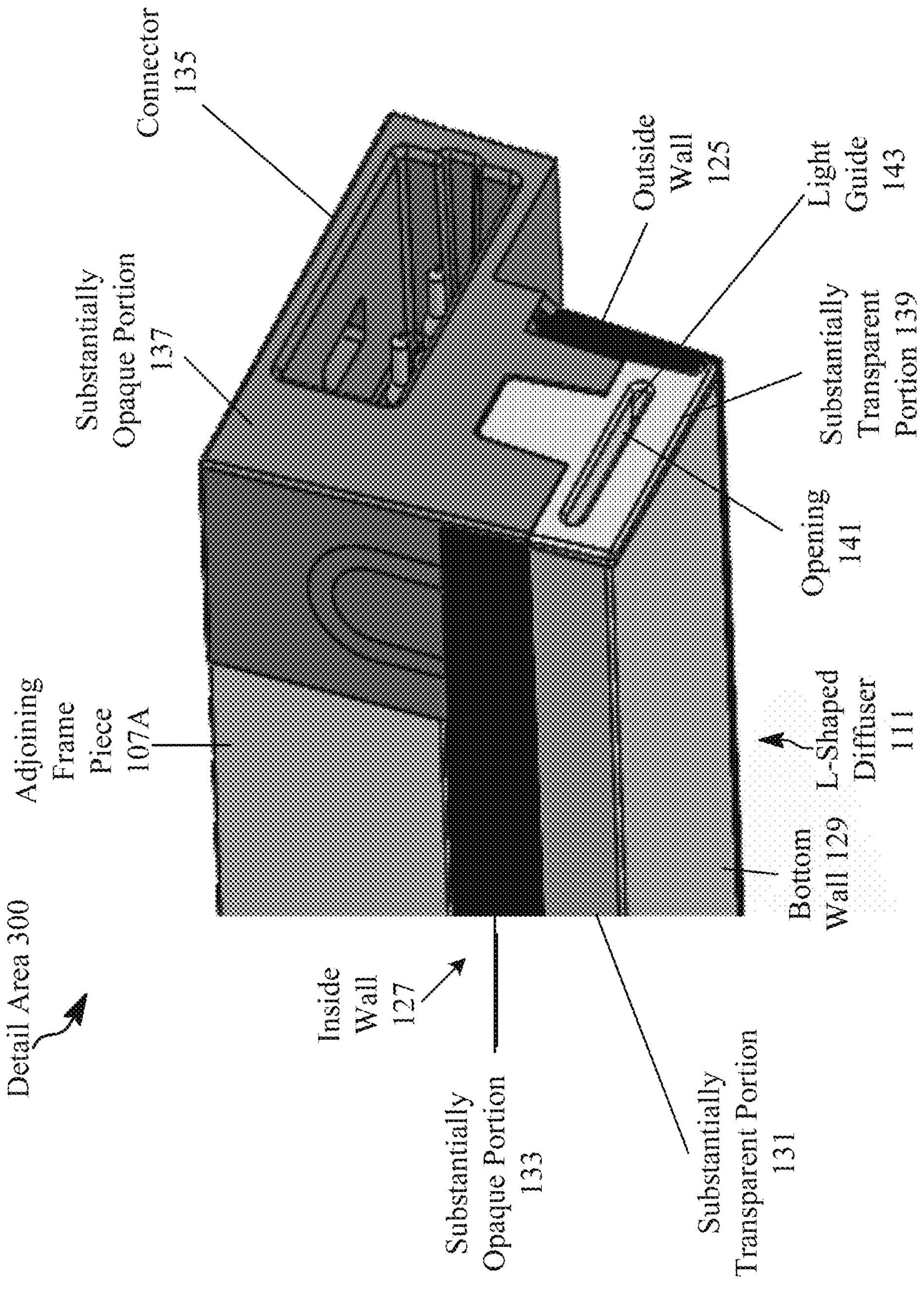
FIGS. 3B-C are cutaway views of the encircled detail area of FIG. 3A and show details of the connector.
Figure 3C:
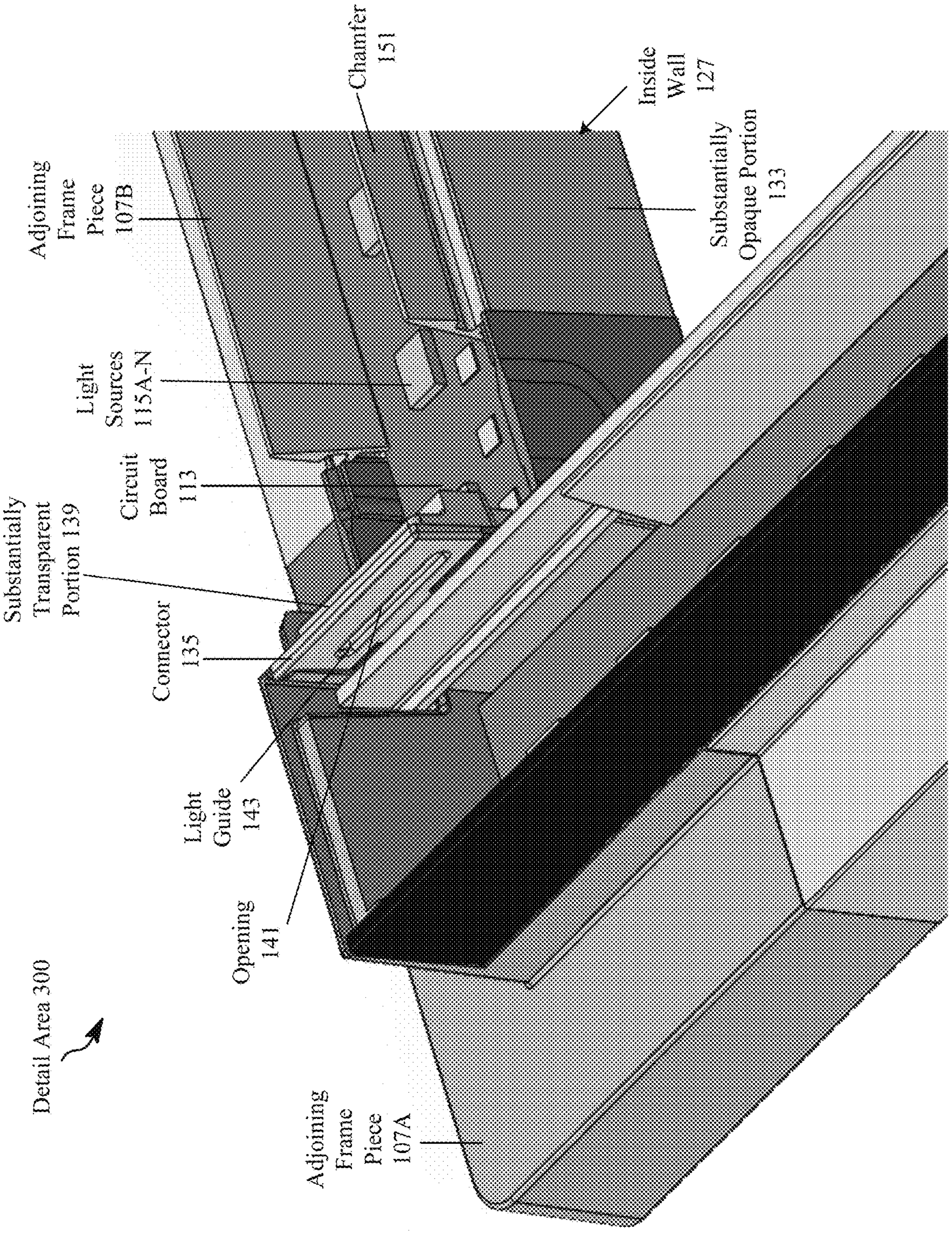

FIG. 3A is an isometric view of the adjoining frame piece 107A, with an encircled detail area 300 to show context for the cutaway views of FIGS. 3B-C of a connector 135 between adjoining frame pieces 107A-B. As shown, the light fixture 101 includes a connector 135 to connect adjoining frame pieces 107A-B of the plurality of frame pieces 107A-N together. Specifically, a plurality of connectors 135A-N can connect the frame pieces 107A-N together for assembly around the ceiling tile 109.

To eliminate shadows at the corners (e.g., connection points or edges) between frame pieces 107A-N, the connectors 135A-N can be formed of a substantially transparent portion 139 to allow light to pass through and have an opening 141 (e.g., gap or aperture) to guide light. Extra light sources 115A-B can also be added near the corners to further eliminate shadows. Such a solution minimizes the transition of the frame pieces 107A-N so the frame 105 looks like one integral piece and the illumination 117 looks more continuous across all of the frame pieces 107A-N.

FIGS. 3B-C are cutaway views of the encircled detail area 300 of FIG. 3A and show details of the connector 135. As shown, the connector 135 includes a substantially opaque portion 137 below the circuit board 113 and a substantially transparent portion 139 above the circuit board 113 to allow illumination 117 to pass between the adjoining frame pieces 107A-B. The substantially transparent portion 139 includes an opening 141 to create a light guide 143 between the adjoining frame pieces 107A-B. The light guide 143 of the substantially transparent portion 139 is configured to reduce a shadow in a corner 145 (see FIG. 5B), such as a connection point or edge, where the adjoining frame pieces 107A-B are connected together. For uniformity of the illumination 117, the transparency of the substantially transparent portion 139 of the connector 135 can be matched to the transparency of the substantially transparent portions of the L-shaped diffuser 111, including the bottom wall 129 and the substantially transparent portion 131 of the inside wall 127.

Figure 4A:
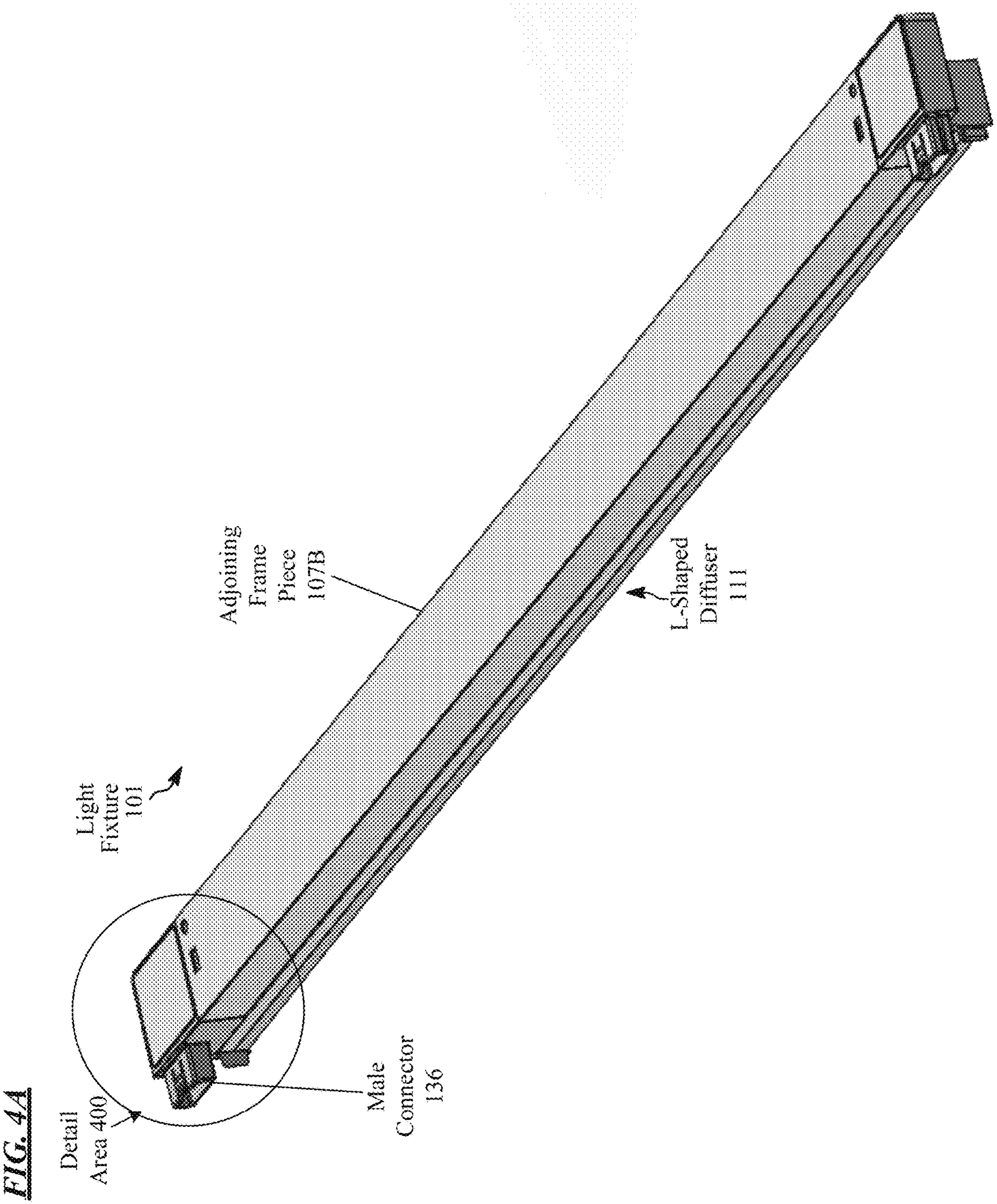
FIG. 4A is an isometric view of the adjoining frame piece, with an encircled detail area to show context for the cutaway view of FIG. 4B of a male connector between adjoining frame pieces 107A-B.
Figure 4B:
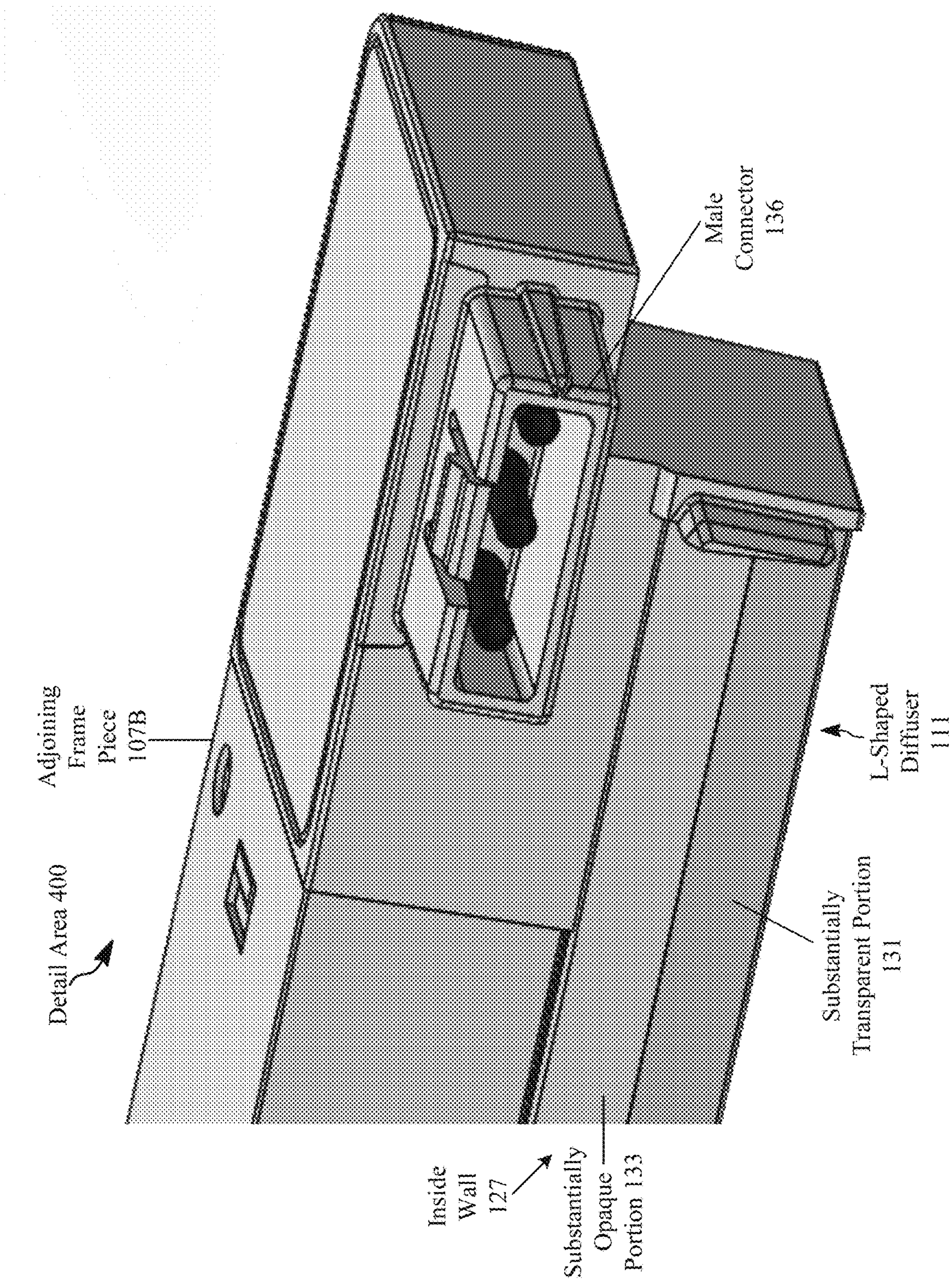
FIG. 4B is a zoomed in view of the encircled detail area of FIG. 4A and shows details of the male connector.

FIG. 4A is an isometric view of the adjoining frame piece 107B, with an encircled detail area 400 to show context for the cutaway view of FIG. 4B of a male connector 136 between adjoining frame pieces 107A-B. FIG. 4B is a zoomed in view of the encircled detail area 400 of FIG. 4A and shows details of the male connector 136.

Light fixture 101 can be assembled with four separate frame pieces 107A-D that an end customer may take out of a package to make the light fixture 101 a square or rectangular shape by attaching connectors 135A-N, 136A-N. Connectors 135A-N, 136A-N can be a female connector 135 like that depicted in FIGS. 3A-C or a male connector 136 like that shown in FIGS. 4A-B. Some of the frame pieces 107A-N include female connectors 135A-N and some include male connectors 136A-N to enable the frame pieces 107A-N to be joined together. A male connector 136 plugs into the female connector 135 to align with the substantially opaque portion 137 of the female connector 135. The male connector 136 is for mechanical and electrical connection and may not include an optical portion, such as a substantially transparent portion. There can be an air gap between the opening 141 of the substantially transparent portion 139 of the female connector 135 of the adjoining frame piece 107A and the male connector 136 of the adjoining frame piece 107B.

Figure 5A:
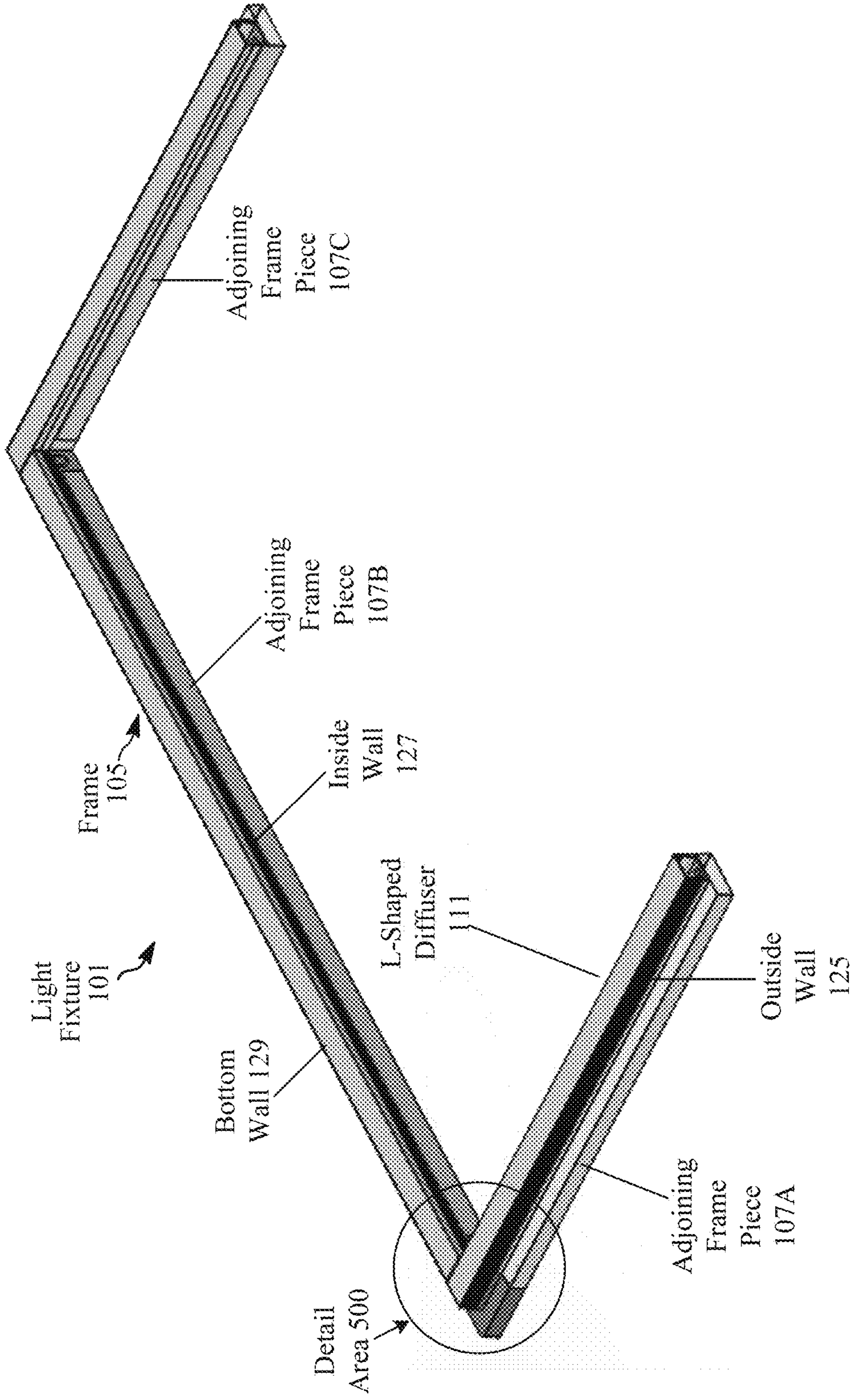
FIG. 5A is a bottom view of the light fixture, with an encircled detail area to show context for the views of FIG. 5B-D of the adjoining frame pieces, circuit board, and the connector.
Figures 5B, 5C, 5D:
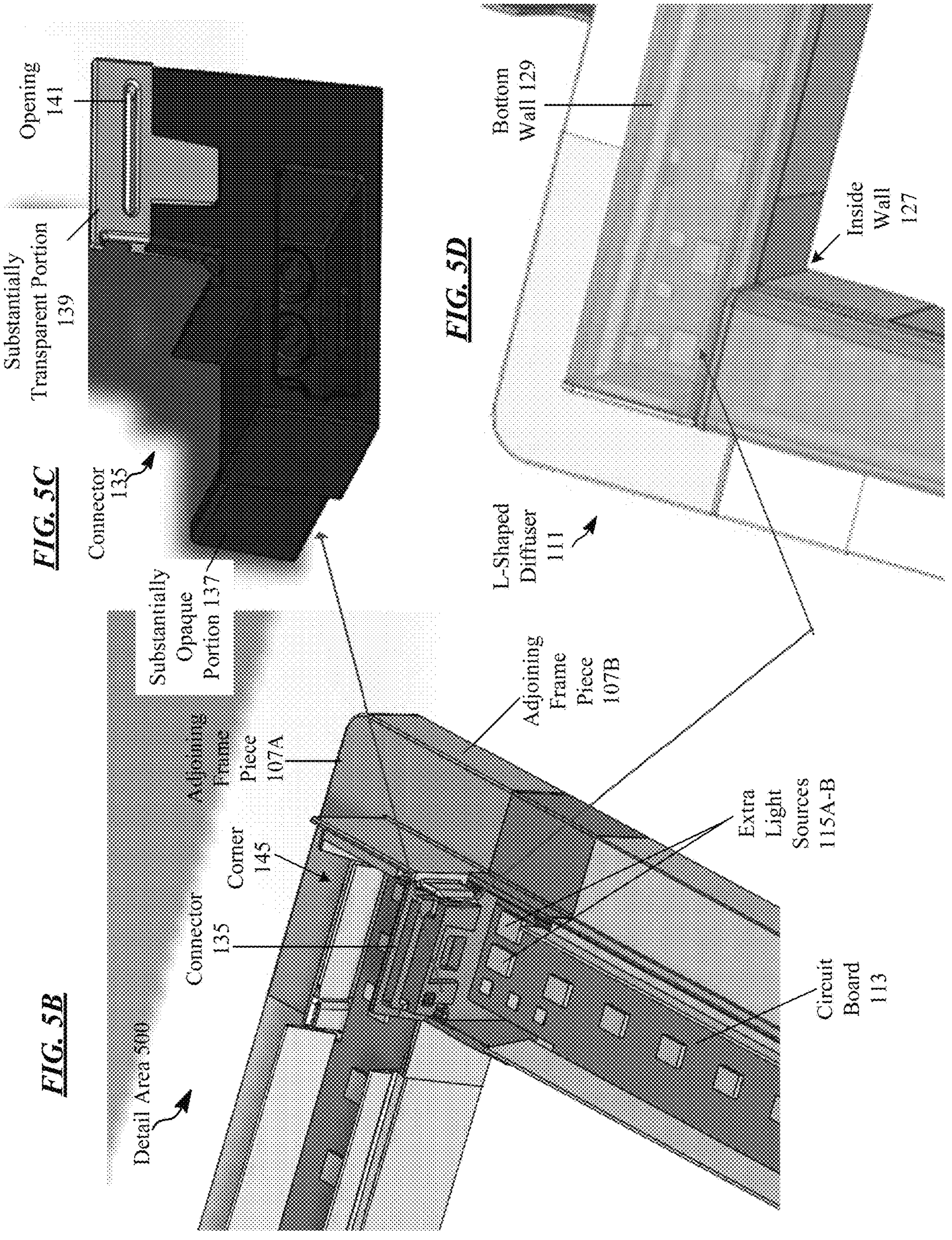
FIG. 5B is a cutaway view of the encircled detail area of FIG. 5A and shows details of the adjoining frame pieces, circuit board, light sources, and the connector.
FIG. 5C is a zoomed in view of the connector that includes a substantially transparent portion and a substantially opaque portion.
FIG. 5D is an isometric view of the assembled light fixture with the connector connecting the adjoining frame pieces together.

FIG. 5A is a bottom view of the light fixture 101, with an encircled detail area 500 to show context for the views of FIG. 5B-D of the adjoining frame pieces 107A-B, circuit board 113, and the connector 135.

FIG. 5B is a cutaway view of the encircled detail area 500 of FIG. 5A and shows details of the adjoining frame pieces 107A-B, circuit board 113, light sources 115A-N, and the connector 135. As shown, the circuit board 113 includes one or more extra light sources 115A-B clustered proximate the opening 141 of the connector 135. Although not shown, the adjoining frame piece 107A also includes electrical connections in a corner 145 to connect to the driver circuit 161.

Adding extra light sources 115A-B can eliminate dark shadows at a corner 145 (e.g., connection point or connecting edge) between adjoining frame pieces 107A-B, for example, at the bar connection point. As shown, doubling up or otherwise increasing a population density of light sources 115A-N near the corner 145 of where the adjoining frame pieces 107A-B abut each other helps eliminate dark shadows in the corners and provides an appearance of continuous illumination. The combination of the extra light sources 115A-B and the connector 135 with the substantially transparent portion 139 and the opening 141 achieves the best aesthetics for the light fixture 101. This combination provides the appearance of a light fixture 101 with continuous illumination by eliminating dark shadows and bright spots in the corner 145 of adjoining frame pieces 107A-B.

However, somewhat diminished aesthetics of the light fixture 101 may still be acceptable in some applications. Having just extra light sources 115A-B without the substantially transparent portion 139 of the connector 135 may result in bright spots at the corner 145, but can still reduce dark shadows. Also, having just an air gap instead of a substantially transparent portion 139 on the connector 135 may result in bright spots at the corner 145, which is a different viewing artifact, but can still reduce dark shadows. Finally, if the connector 135 is formed of an entirely substantially opaque material, but with an opening 141, this may result in a somewhat less dark shadow at the corner 145 of adjoining frame pieces 107A-B.

FIG. 5C is a zoomed in view of the connector 135 that includes a substantially transparent portion 139 and a substantially opaque portion 137. The substantially transparent portion 139 is an optical part of the connector 135 to guide light and the substantially opaque portion 137 is a structural part of the connector 135 to connect the adjoining frame pieces 107A-B and support the substantially transparent portion 139.

To form the connector 135, the substantially transparent portion 139 can be formed integrally with the substantially opaque portion 137 (e.g., as one component or piece) by placing a substantially transparent material and a substantially opaque material in a mold. In this first example, the connector 135 can be injection molded as a single piece. Alternatively, the substantially transparent portion 139 and the substantially opaque portion 137 can be formed separately and then connected together. In this second example, the substantially transparent portion 139 can be configured to snap into the substantially opaque portion 137. The connector 135 can be a mixture of the substantially opaque material and the substantially transparent material with the opening 141 to guide light through the connector 135 to eliminate dark shadows at the corner 145 (e.g., connection point) and have seamless and uniform illumination 117.

The size of the opening 141 of connector 135 may be relatively small and shaped like a slot due to manufacturing and application constraints. In order for the connector 135 to remain mechanically sound and yet provide as much light output as possible between the connection points of adjoining frame pieces 107A-B, the size and shape may be constrained. Hence, there may be some limitations on how large the opening 141 can be in order to not sacrifice the mechanical structure of the connector 135.

FIG. 5D is an isometric view of the assembled light fixture 101 with the connector 135 connecting the adjoining frame pieces 107A-B together. As further shown, the L-shaped diffuser 111 is attached and covering the light sources 115A-N of the circuit board 113. Adding the extra light sources 115A-B to increase the population density of light sources 115A-N near the corner 145 (e.g., intersection) of adjoining frame pieces 107A-B further reduces dark shadows.

Figure 6:
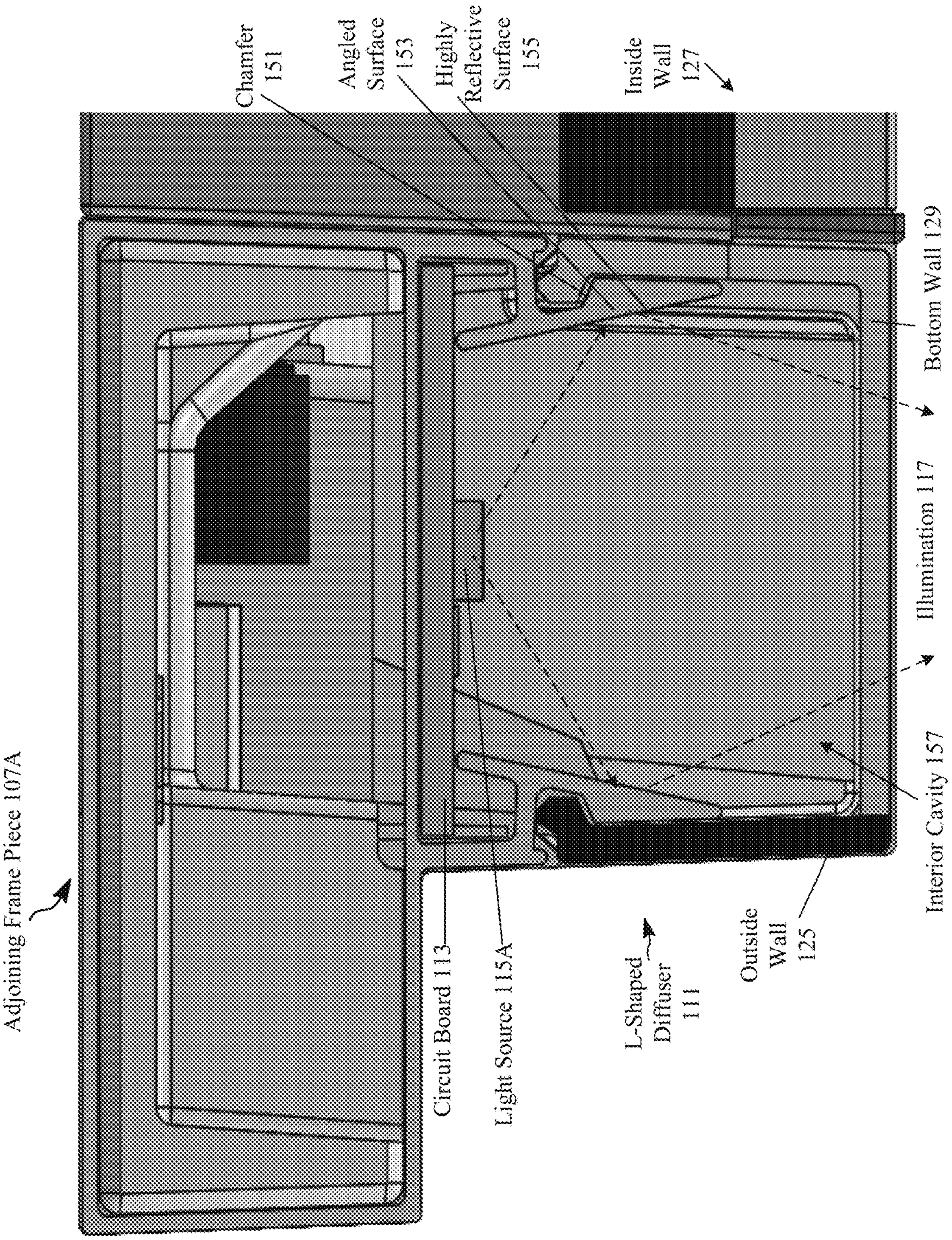
FIG. 6 is a cross-sectional view of the adjoining frame piece depicting details of the circuit board, illumination light source, and a chamfer.

FIG. 6 is a cross-sectional view of the adjoining frame piece 107A depicting details of the circuit board 113, illumination light source 115A, and a chamfer 151. Each of the frame pieces 107A-N of the light fixture 101 can include a chamfer 151 with an angled surface 153 configured to reflect illumination 117. As shown, the chamfer 151 is on both sides of the adjoining frame piece 107A and the bottom wall 129 of the adjoining frame piece 107A is transparent where the L-shaped diffuser 111 is placed. The chamfer 151 is formed as a single piece on each frame piece 107A-N. Chamfer 151 is structural and the extrusion holds the L-shaped diffuser 111 in place and the circuit board 113 down after the circuit board 113 is slid into the adjoining frame piece 107A.

Angled surface 153 of the chamfer 151 can be a beveled surface and can enable the light fixture 101 to achieve high optical efficiency. If the angled surface 153 is 90 degrees, then the light rays emitted from the light sources 115A-N would bounce around and scatter in an interior cavity 157 and the optical efficiency may not be very high. Hence, the angled surface 153 can be less than 90 degrees to cause reflections of light rays emitted from the light sources 115A-N to bounce off the angled surface 153 and reflect in a direction towards the bottom wall 129. The light rays reflected off the angled surface 153 then pass through the bottom wall 129 of the L-shaped diffuser 111 as opposed to scattering around an interior cavity 157.

When light from the light sources 115A-N strikes the chamfer 151, reflectivity is increased which increases optical efficiency because more illumination 117 is outputted from the substantially transparent portions of the L-shaped diffuser 111. In one example, a chamfer 151 formed of bare metal (e.g., aluminum) can achieve a light fixture 101 with an energy efficiency of 118 lumens per watt. This is a significant improvement over the normal energy efficiency requirement of 110 lumens per watt from the U.S. Department of Transportation (DOT) lighting standard.

To further enhance optical efficiency, the angled surface 153 can include a highly reflective surface 155 formed at least in part by a paint, a coating, a laminate, or an anodized metal. Anodizing a base material, such as a metal (e.g., aluminum), that forms the chamfer 151 can create a highly reflective surface 155 with an anodic oxide finish. Or the base material that forms the chamfer 151 can be painted with a highly reflective paint or include an added film to create the highly reflective surface 155. The highly reflective surface 155 may be 90% or more reflective to light, 95% or more reflective to light, or 96% or more reflective to light to maximize light output (e.g., lumen performance) and thus optical efficiency. When the highly reflective surface 155 is 95% or more reflective to light, an energy efficiency of 125 lumens per watt can be achieved which exceeds the premium requirements of the DOT lighting standard.

The angled surface 153 faces an interior cavity 157 between the light sources 115A-N and the inside wall 127 of the L-shaped diffuser 111. The angled surface 153 is configured to cause illumination 117 inside the interior cavity 157 to be emitted through substantially transparent portions of the inside wall 127 and the bottom wall 129 of the L-shaped diffuser 111. The angled surface 153 is oriented at an angle of less than 90 degrees relative to the circuit board 113. The chamfer 151 is co-extruded with the frame pieces 107A-N and is configured to hold the L-shaped diffuser 111 in place and the circuit board 113 down.

The terms "light fixture" or "luminaire" as used herein, are intended to encompass essentially any type of device that processes energy to generate or supply artificial light, for example, for general illumination of a space intended for use of occupancy or observation, typically by a living organism that can take advantage of or be affected in some desired manner by the light emitted from the device. However, a light fixture or luminaire may provide light for use by automated equipment, such as sensors/monitors, robots, etc. that may occupy or observe the illuminated space, instead of or in addition to light provided for an organism. However, it is also possible that one or more light fixtures or luminaires in or on a particular premises have other lighting purposes, such as signage for an entrance or to indicate an exit. In most examples, the light fixture(s) or luminaire(s) illuminate a space or area of a premises to a level useful for a human in or passing through the space, e.g., of sufficient intensity for general illumination of a room or corridor in a building or of an outdoor space such as a street, sidewalk, parking lot or performance venue. The actual source of illumination light in or supplying the light for a light fixture or luminaire may be any type of artificial light emitting device, several examples of which are included in the discussions below. Although the discussion herein is focused on light fixture types of luminaires that have a fixed position in a space, it should be understood that other types of luminaires can be used in lieu of light fixtures, such as lamps, in certain examples.

The term "lighting system" as used herein, is intended to encompass essentially any type of system that either includes a number of such luminaires, such as light fixtures, coupled together for data communication and/or light fixture(s) coupled together for data communication with one or more control devices, such as wall switches, control panels, remote controls, central lighting or building control systems, servers.

The illumination light output of a luminaire, such as a light fixture, for example, may have an intensity and/or other characteristic(s) that satisfy an industry acceptable performance standard for a general lighting application. The performance standard may vary for different uses or applications of the illuminated space, for example, as between residential, office, manufacturing, warehouse, or retail spaces. Any light fixture, however, may be controlled in response to commands received with the network technology of the lighting system, e.g. to turn ON/OFF, to dim the light intensity of the output, to adjust or tune color of the light output (for a light fixture having a variable color source), etc.

Terms such as "illumination," "artificial lighting," or "illumination lighting" as used herein, are intended to encompass essentially any type of lighting that a device produces light by processing of electrical power to generate the light. A luminaire for an artificial lighting or illumination lighting application, for example, may take the form of a light fixture as described herein, a lamp, or other luminaire arrangement that incorporates a suitable light source, where the lighting device component or source(s) by itself contains no intelligence or communication capability. The illumination light output of an artificial illumination type luminaire, such as a light fixture, for example, may have an intensity and/or other characteristic(s) that satisfy an industry acceptable performance standard for a general lighting application.

Terms such as "lighting device" or "lighting apparatus," as used herein, are intended to encompass essentially any combination of an example of a luminaire, such as the light fixture, discussed herein with other elements such as electronics and/or support structure, to operate and/or install the particular luminaire implementation. Such electronics hardware, for example, may include some or all of the appropriate driver(s) for the illumination light sources, any associated control processor or alternative higher level control circuitry, and/or data communication interface(s). The electronics for driving and/or controlling the light sources may be incorporated within the luminaire or located separately and coupled by appropriate means to the light source component(s).

The term "coupled" as used herein refers to any logical, optical, physical, or electrical connection, link or the like by which signals or light produced or supplied by one system element are imparted to another coupled element. Unless described otherwise, coupled elements or devices are not necessarily directly connected to one another and may be separated by intermediate components, elements, or communication media that may modify, manipulate, or carry the light or signals The orientations of the lighting system 100, lighting device 160, associated components, and/or any complete devices incorporating the light fixture 101, such as shown in any of the drawings, are given by way of example only, for illustration and discussion purposes. In operation, the light fixture 101 may be oriented in any other direction suitable to the particular application, for example upright, sideways, or any other orientation. Also, to the extent used herein, any directional term, such as lateral, longitudinal, up, down, upper, lower, top, bottom, above, below, front, rear, side, left, and right are used by way of example only, and are not limiting as to direction or orientation of any light fixture 101 or component of the light fixture 101 constructed as otherwise described herein.

Unless otherwise stated, any and all measurements, values, ratings, positions, magnitudes, sizes, angles, and other specifications that are set forth in this specification, including in the claims that follow, are approximate, not exact. Such amounts are intended to have a reasonable range that is consistent with the functions to which they relate and with what is customary in the art to which they pertain. For example, unless expressly stated otherwise, a parameter value or the like may vary by as much as ±5% or as much as ±10% from the stated amount. The terms "approximately," "significantly," or "substantially" mean that the parameter value or the like varies up to +25% from the stated amount. The term "substantially transparent" means 85% or more transmissive to light. The term "substantially opaque" means 20% or less transmissive to light. The term "partially substantially transparent" means a portion is substantially transparent and another portion is substantially opaque. The term "highly reflective" means 90% or more reflective to light.

It will be understood that the terms and expressions used herein have the ordinary meaning as is accorded to such terms and expressions with respect to their corresponding respective areas of inquiry and study except where specific meanings have otherwise been set forth herein. Relational terms such as first and second and the like may be used solely to distinguish one entity or action from another without necessarily requiring or implying any actual such relationship or order between such entities or actions. The terms "comprises," "comprising," "includes," "including," "has," "having," "containing," "contain", "contains," "with," "formed of," or any other variation thereof, are intended to cover a non-exclusive inclusion, such that a process, method, article, or apparatus that comprises or includes a list of elements or steps does not include only those elements or steps but may include other elements or steps not expressly listed or inherent to such process, method, article, or apparatus. An element preceded by "a" or "an" does not, without further constraints, preclude the existence of additional identical elements in the process, method, article, or apparatus that comprises the element.

In addition, in the foregoing Detailed Description, it can be seen that various features are grouped together in various examples for the purpose of streamlining the disclosure. This method of disclosure is not to be interpreted as reflecting an intention that the claimed examples require more features than are expressly recited in each claim. Rather, as the following claims reflect, the subject matter to be protected lies in less than all features of any single disclosed example. Thus, the following claims are hereby incorporated into the Detailed Description, with each claim standing on its own as a separately claimed subject matter.

While the foregoing has described what are considered to be the best mode and/or other examples, it is understood that various modifications may be made therein and that the subject matter disclosed herein may be implemented in various forms and examples, and that they may be applied in numerous applications, only some of which have been described herein. It is intended by the following claims to claim any and all modifications and variations that fall within the true scope of the present concepts.

The scope of protection is limited solely by the claims that now follow. That scope is intended and should be interpreted to be as broad as is consistent with the ordinary meaning of the language that is used in the claims when interpreted in light of this specification and the prosecution history that follows and to encompass all structural and functional equivalents. Notwithstanding, none of the claims are intended to embrace subject matter that fails to satisfy the requirement of Sections 101, 102, or 103 of the Patent Act, nor should they be interpreted in such a way. Any unintended embracement of such subject matter is hereby disclaimed.

What is claimed is:

1. A light fixture, comprising:

a frame that includes a plurality of frame pieces configured for assembly around a ceiling tile to form the light fixture, each of the plurality of frame pieces including an L-shaped diffuser and a circuit board that includes a plurality of light sources to emit illumination;

wherein:

the L-shaped diffuser includes a diffuser body that is asymmetric in transparency to direct more illumination from the light sources to inside the ceiling tile than outside the ceiling tile;

the diffuser body includes an outside wall that is substantially opaque, an inside wall that is at least partially substantially transparent, and a bottom wall that is substantially transparent; and the inside wall includes an upper portion that is substantially opaque and a lower portion that is substantially transparent.

2. The light fixture of claim 1, wherein:

the lower portion is configured to illuminate inside the ceiling tile and the upper portion is configured to direct illumination to the bottom wall.

3. The light fixture of claim 1, wherein:

the outside wall is substantially opaque to block illumination from appearing outside of the ceiling tile and thereby reduce glare.

4. The light fixture of claim 1, wherein:

the diffuser body is co-extruded as a single extrusion of optical material with a white pigment for substantially opaque portions.

5. The light fixture of claim 4, wherein:

the optical material is formed of polycarbonate or acrylic.

6. The light fixture of claim 1, further comprising:

a connector to connect adjoining frame pieces of the plurality of frame pieces together;

wherein the connector includes a substantially opaque portion below the circuit board and a substantially transparent portion above the circuit board to allow illumination to pass between the adjoining frame pieces.

7. The light fixture of claim 6, wherein the substantially transparent portion includes an opening to create a light guide between the adjoining frame pieces.

8. The light fixture of claim 7, wherein the light guide of the substantially transparent portion is configured to reduce a shadow in a corner where the adjoining frame pieces are connected together.

9. The light fixture of claim 7, wherein the circuit board includes one or more extra light sources clustered proximate the opening.

10. The light fixture of claim 6, wherein the connector is injection molded as a single piece.

11. The light fixture of claim 6, wherein the substantially transparent portion is configured to snap into the substantially opaque portion.

12. The light fixture of claim 1, where each of the frame pieces includes a chamfer with an angled surface configured to reflect illumination.

13. The light fixture of claim 12, where the angled surface includes a highly reflective surface formed at least in part by a paint, a coating, a laminate, or an anodized metal.

14. The light fixture of claim 12, where the angled surface faces an interior cavity between the light sources and the inside wall of the L-shaped diffuser.

15. The light fixture of claim 14, where the angled surface is configured to cause illumination inside the interior cavity to be emitted through substantially transparent portions of the inside wall and the bottom wall of the L-shaped diffuser.

16. The light fixture of claim 12, where the angled surface is oriented at an angle of less than 90 degrees relative to the circuit board.

17. The light fixture of claim 12, where the chamfer is co-extruded with the frame pieces and is configured to hold the L-shaped diffuser in place and the circuit board down.

18. A lighting device, comprising:

a light fixture including a frame that includes a plurality of frame pieces configured for assembly around a ceiling tile to form the light fixture, each of the plurality of frame pieces including an L-shaped diffuser and a circuit board that includes a plurality of light sources to emit illumination, wherein the L-shaped diffuser includes a diffuser body that is asymmetric in transparency to direct more illumination from the light sources to inside the ceiling tile than outside the ceiling tile; and a connector to connect adjoining frame pieces of the plurality of frame pieces together, wherein the connector includes a substantially opaque portion below the circuit board and a substantially transparent portion to create a light guide above the circuit board to allow illumination to pass between the adjoining frame pieces.

19. The lighting device of claim 18, where each of the frame pieces includes a chamfer with an angled surface configured to reflect illumination.

20. The lighting device of claim 18, further comprising:

a driver circuit to control the light sources; and a cable configured to connect via electrical connection to the circuit board and the driver circuit to control the light sources;

wherein the driver circuit is configured to mount on a ceiling tile grid and is mounted separate from the light fixture assembled around the ceiling tile.

21. A light fixture, comprising:

a frame that includes a plurality of frame pieces configured for assembly around a ceiling tile to form the light fixture, each of the plurality of frame pieces including an L-shaped diffuser and a circuit board that includes a plurality of light sources to emit illumination;

wherein:

the L-shaped diffuser includes a diffuser body that is asymmetric in transparency to direct more illumination from the light sources to inside the ceiling tile than outside the ceiling tile;

the diffuser body includes an outside wall that is substantially opaque, an inside wall that is at least partially substantially transparent, and a bottom wall that is substantially transparent;

the outside wall and the inside wall are parallel and vertical; and the bottom wall is perpendicular to the outside wall and the inside wall.

* * * * *